Figure 1:
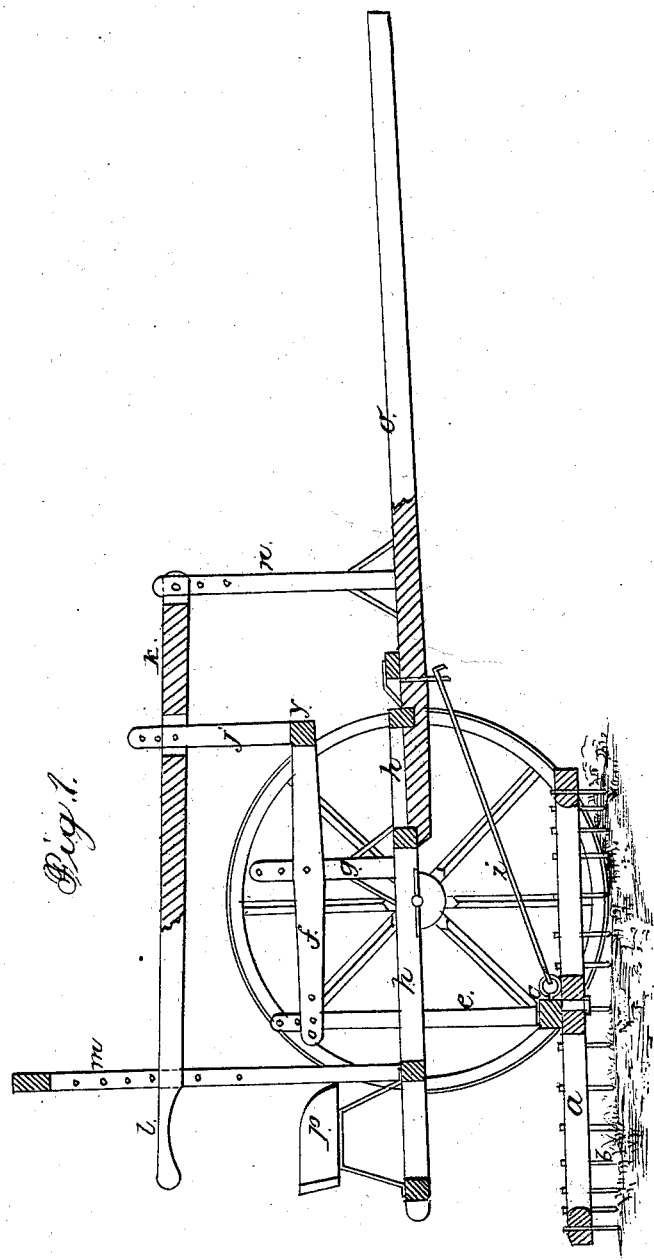

2 Sheets—Sheet 1.

S. M. GARVER.
Revolving Harrow.

No. 39,806. Patented Sept. 8. 1863.

WITNESSES:
Charles Smith
T. Schutlus

INVENTOR:
S. M. Garver
By Munn & Co.
Atty

S. M. GARVER.
Revolving Harrow.
No. 39,806.
2 Sheets—Sheet 2.
Patented Sept. 8. 1863.
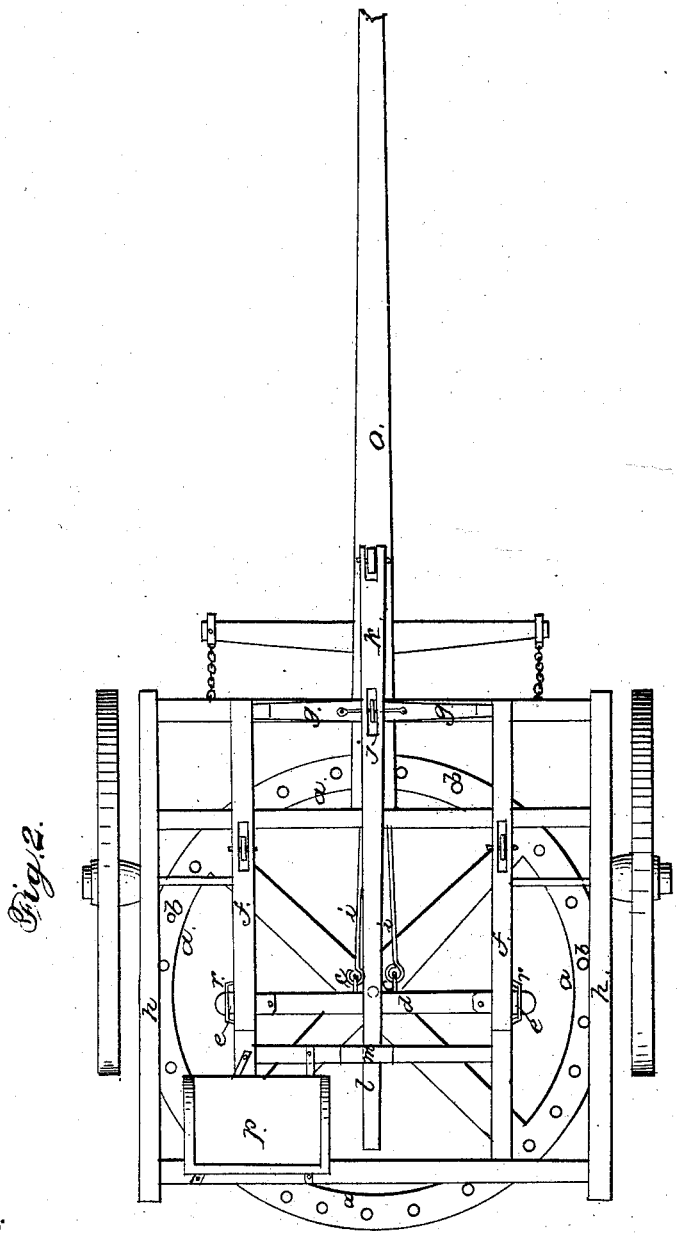
WITNESSES:
Charles Smith
J. Scheiller
INVENTOR:
S. M. Garver
By Munn & Co.
Attys.

UNITED STATES PATENT OFFICE.

S. M. GARVER, OF MONTICELLO, ILLINOIS.

IMPROVEMENT IN ROTATING HARROWS.

Specification forming part of Letters Patent No. 39,806, dated September 8, 1863.

*To all whom it may concern:*

Be it known that I, S. M. GARVER, of Monticello, in the county of Pratt and State of Illinois, have invented a new and useful Improvement in Harrows; and I do hereby declare that the following is a full, clear, and exact description of the same, reference being had to the accompanying drawings, forming a part of this specification, in which—

Figure 1 represents a vertical central section, and Fig. 2 a plan, of my machine.

Similar letters of reference in each of the several figures indicate corresponding parts.

The nature of my invention consists in the relative arrangement of a harrow, suspenders, adjustable lever, and adjustable hand-levers in the manner and for the purposes hereinafter to be described.

To enable others skilled in the art to make and use my invention, I will proceed to describe its construction and operation.

A circular harrow, $a$, provided with the usual teeth, $b$, is free to turn on a pivot, $c$, projecting downward from a cross-bar, $d$. This cross-bar is hung to the forward part of the main frame by means of two connecting-rods, $i$, forming a link which allows the cross-bar to play vertically. The cross-bar is also hung to the rear ends of two levers, $f$, by means of suspenders $e$, the latter being guided in their vertical play by staples $r$, fastened to the main frame $h$.

The rear ends of the levers $f$, as well as the upper ends of the suspenders, are each provided with several holes, as seen in Fig. 1. By this means the harrow can not only be adjusted to penetrate to a greater or less depth, but it can also be set at a proper distance from the center of the machine to obtain the equilibrium of the whole machine. The levers $f$ have their fulcra in standards $g$, projecting upward from main frame $h$.

A cross-bar, $y$, is pivoted to the forward ends of the levers $f$, and a suspender, $j$, projecting upward from said cross-bar, is hung to a lever, $k$.

The pivots at the end of the cross-bar, turning in the ends of the levers $f$, can be elevated or depressed any desired distance by means of the suspender $j$ and lever $k$, for the purpose of depressing or elevating the harrow correspondingly, so as to conform to the inequalities in the surface, or to lift the harrow over large stones or similar impediments without stopping the progress of the machine.

When the machine is to be removed from one field to another the handle $l$ of the lever $k$—the forward end of the lever being pivoted to a standard, $n$, projecting from the tongue $o$—is depressed, so as to lift and keep the harrow suspended above the ground.

The handle is adjustable by means of a pin inserted through one of a series of holes in a slotted standard, $m$, and is arranged near the driver's seat $p$, so that he can operate it with convenience.

As it is desirable to adjust the machine to different-sized horses and yet keep the handle $l$ of lever $k$ at the same average height convenient to the driver's hand, another adjustment is provided by which the harrow can be raised or lowered, to wit: The standards $g$ are provided with a series of holes for the insertion of the fulcrum-pins of levers $f$, and the suspenders $j$ are made with a similar series of holes to adjust their connection with the lever $k$.

What I claim as my invention, and desire to secure by Letters Patent, is—

The relative arrangement of a harrow, $a$, suspenders $e$, adjustable lever $f$, and adjustable hand-lever $k$, in the manner and for the purposes set forth.

S. M. GARVER.

Witnesses:
 N. E. RHOADES,
 L. J. BOND.